UNITED STATES PATENT OFFICE.

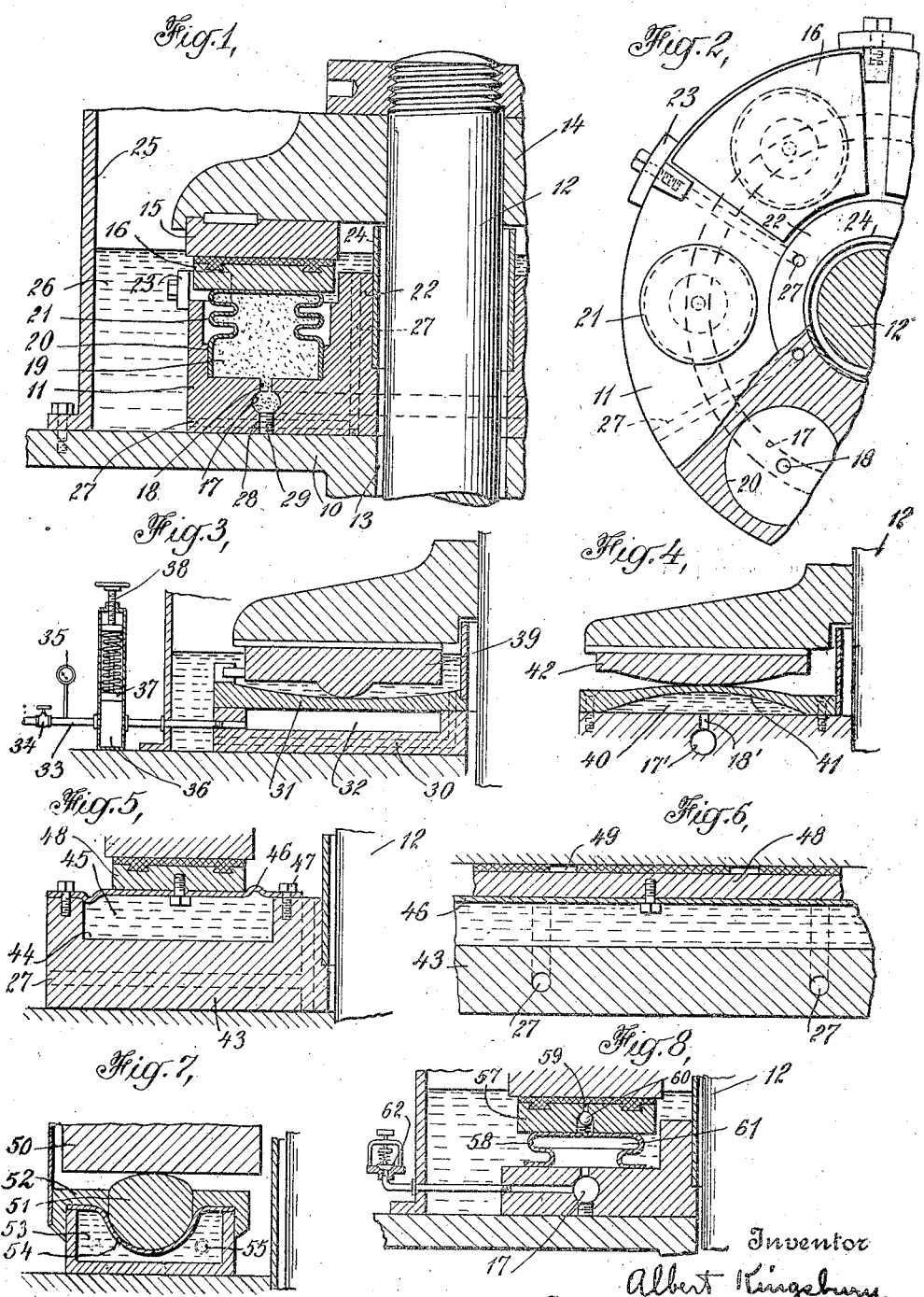
A. KINGSBURY.
BEARING.
APPLICATION FILED JAN. 30, 1919.
1,425,979.
Patented Aug. 15, 1922.

ALBERT KINGSBURY, OF PITTSBURGH, PENNSYLVANIA.

BEARING.

1,425,979. Specification of Letters Patent. Patented Aug. 15, 1922.

Application filed January 30, 1919. Serial No. 273,936.

*To all whom it may concern:*

Be it known that I, ALBERT KINGSBURY, a citizen of the United States of America, and a resident of Pittsburgh, Allegheny County, and State of Pennsylvania, have invented certain new and useful Improvements in Bearings, of which the following is a specification, reference being had to the accompanying drawings, forming a part thereof.

My invention relates to bearings and has special reference to thrust bearings which comprise a plurality of annularly arranged bearing segments or shoes. While applicable to other bearings, the invention has particular utility when embodied in bearings which comprise bearing segments or shoes that are adapted to flex or tilt both circumferentially and radially, so as to automatically wedge oil between the bearing surfaces and equitably distribute the pressure over each of the bearing segments in accordance with the principles of the Kingsbury bearings.

One object of my invention is to provide a bearing of the aforesaid character which comprises an improved mobile fluid support for the bearing segments.

Another object of my invention is to provide a fluid containing chamber which is arranged and constructed to support an annular series of bearing segments or shoes in such manner as to equitably distribute the pressure thereon.

A further object of my invention is to provide a fluid containing chamber which comprises yielding parts or members on which the bearing segments or shoes may be supported in such manner as to permit them to flex or tilt freely in all directions.

An additional object of my invention is to provide means whereby the pressure of the fluid on the yielding supports for the bearing segments may be adjusted to compensate for varying conditions of operation, and may if desired be substantially maintained at any required predetermined pressure.

A further object of my invention is to provide a bearing comprising a plurality of independent bearing segments or shoes with fluid-containing means on which said segments or shoes are individually mounted for relative tilting movement.

Another object of my invention is to provide improved individual yielding supports for the bearing segments or shoes and also, preferably to equitably distribute the pressure of said segments or shoes by a mobile fluid.

Another object of my invention is to provide a mobile-fluid support in which the pressure of the fluid is automatically maintained at a predetermined amount by the normal operation of the bearing.

Other objects relate to the provision of a mobile-fluid support which is not subject to leakage, which is strong and durable, which is simple in construction and which performs its function efficiently.

In my copending application S. #80,569, filed Feb. 26, 1916, I have shown and described a flexible ring equalizer, on which a plurality of bearing segments are supported in such manner that the thrust pressures are equitably distributed among them. In the present application I have shown another form of invention, in which a mobile fluid support—or one or more elastic metal members cooperating with the fluid support—takes the place of the flexible equalizing ring of the aforesaid earlier application.

One form of the present invention was disclosed in my copending application, Serial No. 165,685 filed May 1, 1917, of which this application is in part a continuation.

In order that my invention may be thoroughly understood I will now proceed to describe the same in the following specification, and will then point out the novel features thereof in appended claims. The invention is capable of receiving a variety of mechanical expressions several of which are shown on the accompanying drawings. but it is to be expressly understood that the drawings are for purposes of illustration only and are not to be construed as a definition of the limits of the invention, reference being had to the appended claims for that purpose.

Referring to the drawings:

Figure 1 is a sectional elevation showing a portion of a thrust bearing arranged and constructed in accordance with my invention and constituting one embodiment thereof.

Figure 2 is a partially sectional plan view of the same bearing, certain of the parts being removed and others broken away to show the construction in detail.

Figures 3, 4 and 5 are views corresponding to Figure 1, of other structures which also constitute embodiments of my invention.

Figure 6 is a circumferential section, developed into a single plane, of the Figure 5 construction.

Still another embodiment of my invention is shown in Figure 7, which is a sectional elevation corresponding in part to Figure 5.

Figure 8 is a partial elevation in section of a further embodiment of my invention.

In the form shown in Figures 1 and 2,—10 designates a supporting bracket or frame on which a base ring 11 is mounted. A shaft 12 extends through an opening 13 in the bracket and through the base ring and has suitably affixed to it at its upper end a thrust block 14. A thrust collar 15 is secured to the thrust block in any suitable way and cooperates with a series of bearing shoes or segments 16.

The base ring 11 has an annular passage 17 which communicates by auxiliary passages 18 with each of a plurality of fluid chambers 19. These fluid chambers are formed in the construction illustrated by providing a series of circumferentially spaced recesses 20 in the base ring and securing a yielding or elastic fluid-containing support 21 in each recess. The elastic containers may be of any suitable construction and are shown in the form of bellows, preferably made of sheet metal. They are filled with a suitable fluid, preferably a substantially non-compressible liquid such as oil, glycerine, grease, water, etc., which also fills the annular passage 17. Each of the shoes 16 is seated on one of the elastic fluid-containing supports 21 and fits loosely between an inner flange 22 of the base ring and lugs or projections 23 which are located at the outer corners of the shoes, the arrangement of parts being such that the proper relation is maintained between the shoes without interfering with a limited individual and independent movement of each shoe.

A tube or sleeve 24, of slightly larger internal diameter than the shaft 12, is secured to the base and forms, in conjunction with the housing 25, an annular oil well 26 in which the bearing members are contained, the oil level being sufficiently high to immerse the bearing surfaces. The inner and outer chambers into which the oil well is divided by the bearing members are connected by the passages 27 which extend radially inward through the base ring 11 in the form illustrated and axially upward as shown in broken lines in Figure 1.

The base ring has an opening 28 in the bottom which is arranged to open into the annular passage 17 and is provided with a screw plug 29. The arrangement of parts is such that after the elastic fluid-containing supports 21 are pressed into the recesses 20 the complete structure may be inverted and the liquid which is to fill the spaces introduced through the opening 28. When said spaces, including the flexible or yielding supports 21, the annular passage 17 and the short auxiliary passages 18, are all filled, the plug 29 is introduced so that the liquid is confined, and the base ring may then be mounted in place. When the shoes are mounted on the elastic supports 21 they are free to tilt both circumferentially—so as to establish a lubricating film at the bearing surfaces—and also radially—so as to equitably distribute the pressure over the entire area of each of the shoes—even if the collar 15 with which the shoes cooperate is crowned or distorted from any cause. Furthermore, the thrust pressure will be equitably distributed among the several shoes because of the transmission of fluid pressure from one of the elastic supports to another through the interconnecting annular passage 17.

It is evident that the mobile fluid container may be formed in various ways, and Figure 3 shows another embodiment of my invention in which the base ring 30 is provided with a continuous annular channel that is covered by an annular flexible cap or cover plate 31; thus forming an annular fluid chamber 32 into which some suitable fluid may be introduced under the necessary pressure through the pipe 33. An auxiliary chamber 36, which is provided with a spring-pressed plunger 37, may be supplied to automatically maintain the required pressure in the fluid chamber 32; and this pressure may be varied as desired by means of the screw 38, the pressure existing in said chamber being indicated by the gage 35.

The flexible cover plate 31 forms a support on which the bearing members or shoes 39 are tiltably mounted. The elastic yielding of the flexible cover 31 transmits the bearing pressure to the fluid within the chamber 32; and the latter acts, as before, to establish and maintain an equitable distribution of the load or end pressure on the several shoes.

Figure 4 shows another construction in which fluid is maintained under pressure in a series of chambers 40, each one of which is formed by a flexible concave-convex disc 41 that is bolted tightly or otherwise suitably secured to the base ring and serves to support one of the bearing shoes 42. The separate chambers 40 are interconnected, as in Figure 1, by the annular passage 17' and the auxiliary passages 18'. The plan view of this construction is not shown but is similar in general to that shown in Figure 2.

Referring now to Figures 5 and 6, the base 43—which corresponds to the base 30 of Figure 3—is here shown as provided with an annular channel 44 that is filled with a non-compressible liquid, such as oil or preferably a heavy grease, indicated at 45. An elastic or flexible diaphragm 46 is secured to the base by bolts 47 or other suitable means and closes the channel. Instead of independent shoes a flexible bearing ring 48 is mounted on, and may be secured to, the diaphragm. The surface of the member 48 is sub-divided by radial grooves 49 and the thrust pressure is equitably distributed over the several bearing segments by the transverse and longitudinal flexibility of the bearing ring and the mobility of its fluid support.

A further embodiment of my invention is shown in Figure 7 in which bearing shoes 50 are tiltably mounted on pistons or plungers 51 which have spherically curved tops and fit into guide cylinders 52. These guide cylinders have the form of suitable discs or lids which are pressed or otherwise suitably secured, and sealed, into or onto the mouth of fluid containing cups 53. A diaphragm 54 of leather or other suitable semi-elastic material is stretched across the opening of each cup, below the piston or plunger therefor, and serves to effectively seal the chamber against any escape of fluid. The cups are preferably filled with glycerine or some viscous liquid; and in order to secure the equitable distribution of pressure on the several shoes of the bearing the several cups or cells 53 are interconnected by pipes 55 which may be brazed or welded into their walls.

A modification of the Figure 1 construction is shown in Figure 8 in which each shoe 57, corresponding to shoe 16, is mounted on a flexible, bellows shaped container 58 and has a passage 59 which is substantially normal to its bearing surface and terminates at a high pressure point therein. The passage has a spring-pressed check valve 60 in it and obviously opens when the pressure in the chamber 61 falls below the pressure in the oil film at the bearing surface where the passage 59 terminates.

An adjustable safety valve 62 may be connected to the annular interconnecting passage 17 to relieve excess pressure within the chambers 61.

The shoes are annularly arranged as in the Figure 1 construction and the operation of the bearing is the same except for the fact that the Figure 8 arrangement provides for the automatic replenishing of the oil in the oil chambers beneath the shoes.

Structures of preferred form and construction have been illustrated and described for the purpose of showing ways in which this invention may be used, but the inventive thought upon which this application is based is broader than these illustrative embodiments thereof, and I therefore intend no limitations other than those imposed by the appended claims.

What I claim is:

1. A thrust bearing comprising relatively rotatable bearing members including a plurality of annularly-arranged bearing segments and fluid means on which said segments are mounted to tilt with respect thereto.

2. A thrust bearing comprising relatively rotatable bearing members including a plurality of bearing segments and a plurality of interconnected fluid-containing chambers on which said segments are individually mounted.

3. A thrust bearing comprising relatively rotatable bearing members including a plurality of annularly-arranged bearing segments and fluid means on which said segments are mounted to move relatively in all directions.

4. A thrust bearing comprising relatively rotatable bearing members including a plurality of annularly-arranged bearing segments and fluid means on which said segments are individually mounted for relative tilting movement.

5. A thrust bearing comprising relatively rotatable bearing members including a plurality of annularly-arranged bearing segments and fluid means for equitably distributing the pressure on said segments and with respect to which said segments are flexibly mounted.

6. A thrust bearing comprising a pair of relatively rotatable bearing members, of which one comprises a plurality of bearing shoes, a plurality of fluid containing supports for the several shoes and means for interconnecting the fluid containing supports.

7. A thrust bearing comprising a plurality of circumferentially spaced bearing members, a base ring having a series of recesses therein corresponding in number and location to the bearing members, and a flexible fluid container sealed into each recess and interposed between the corresponding bearing member and the base ring.

8. A thrust bearing comprising a plurality of circumferentially spaced bearing members, a base ring having a series of recesses therein corresponding in number and location to the bearing members, a flexible fluid container sealed into each recess and interposed between the corresponding bearing member and the base ring, and an annular channel forming a fluid connection between the individual containers.

9. A thrust bearing comprising a thrust supporting ring, a plurality of flexible fluid containers secured to the ring and extending axially therefrom, means for interconnecting the fluid containers, and a plurality of bearing members mounted on the flexible containers, whereby a fluid support is provided and the thrust pressures equitably distributed among the several bearing members.

10. A bearing comprising relatively movable bearing members including a plurality of bearing segments, supporting means for said segments whereby they may tilt circumferentially of the bearing, and fluid means for equitably distributing the pressure on said segments.

11. A bearing comprising relatively movable bearing members including a plurality of bearing segments, means for supporting said segments whereby they may have relative movement in all directions, and fluid means for equitably distributing the pressure on said segments.

12. A bearing comprising relatively movable bearing members including a plurality of bearing segments, supporting means for said segments whereby they may tilt radially of the bearing, and fluid means for equitably distributing the pressure on said segments.

13. A bearing comprising relatively movable bearing members including a plurality of independently movable bearing segments, individual supports for said segments, and fluid means for equitably distributing the pressure on said segments.

14. A bearing comprising relatively movable bearing members including a plurality of independently movable bearing segments, individual supports on which said segments are tiltably mounted, and fluid means for equitably distributing the pressure on said segments.

15. A bearing comprising relatively movable bearing members including a plurality of annularly-arranged bearing segments, a fluid-containing member, and means for mounting said segments to tilt with respect to said member, the fluid in said member operating to equitably distribute the pressure on said segments.

16. A bearing comprising relatively movable bearing members including a plurality of bearing segments, and a plurality of fluid-containing chambers for individually supporting said segments.

17. A bearing comprising relatively movable bearing members including a plurality of bearing segments, and a plurality of interconnected yieldable fluid-containing supports for said segments.

18. A bearing comprising relatively movable bearing members including a plurality of bearing segments, and a plurality of fluid-containing chambers on which said segments are flexibly mounted.

19. A bearing comprising relatively movable bearing members including a plurality of bearing segments, and a plurality of inter-connected fluid-containing chambers on which said segments are tiltably mounted.

20. A bearing comprising relatively movable bearing members including a plurality of bearing segments, and a plurality of flexible walls providing fluid-containing chambers by which said segments are flexibly mounted.

21. A bearing comprising relatively movable bearing members including a plurality of bearing segments, and a plurality of bellows-like walls by which said segments are flexibly mounted.

22. A bearing comprising relatively movable bearing members including a plurality of bearing segments, a plurality of flexible walls by which said segments are tiltably mounted, said walls providing fluid-containing chambers, and means for inter-connecting said chambers.

23. A bearing comprising relatively movable bearing members including a plurality of bearing segments, fluid means for supporting said segments, and means to automatically maintain the pressure in said fluid-supporting means.

24. A bearing comprising relatively movable bearing members including a plurality of bearing segments, fluid means for supporting said segments, and means whereby the normal operation of the bearing maintains a predetermined pressure in said fluid supporting means.

25. A bearing comprising relatively movable bearing members including a plurality of bearing segments, fluid means for supporting said segments, and a valve-controlled passage for admitting oil to said fluid-supporting means if the pressure therein drops below a pre-determined amount.

26. A bearing comprising relatively movable bearing members including a plurality of bearing segments, a plurality of fluid-containing chambers for supporting said segments, and automatic means for admitting oil to said chambers if the pressure therein drops below a pre-determined amount.

27. A bearing comprising relatively movable bearing members including a plurality of bearing segments, and a plurality of flexible walls by which said segments are individually mounted.

28. A bearing comprising relatively movable bearing members including a plurality of bearing segments, a plurality of flexible walls providing chambers on which said segments are individually mounted, means inter-connecting said chambers, and means in said chambers for equitably distributing the pressure on said segments.

29. A bearing comprising relatively movable bearing members including a plurality of bearing segments, a plurality of fluid-containing chambers on which said segments are individually mounted to tilt with respect thereto, and means inter-connecting said chambers.

30. A bearing comprising relatively movable bearing members including a plurality of annularly-arranged bearing segments, and fluid-containing supporting means on which said segments are independently mounted.

31. A bearing comprising relatively movable bearing members including a plurality of bearing segments mounted on a plurality of interconnected fluid-containing chambers.

32. A bearing comprising relatively movable bearing members including a plurality of bearing segments, a plurality of flexible walls providing fluid-containing chambers on which said segments are mounted, and means interconnecting said chambers.

In witness whereof, I have hereunto set my hand this 28th day of January, 1919.

ALBERT KINGSBURY.